United States Patent
Leversby et al.

(10) Patent No.: US 6,276,019 B1
(45) Date of Patent: *Aug. 21, 2001

(54) TOOTHBRUSH AND METHOD FOR MAKING SUCH TOOTHBRUSH

(75) Inventors: Knut Olaf Leversby, Sandvika; Knut Andresen; Nils Terje Vestheim, both of Oslo, all of (NO)

(73) Assignee: SmithKline Beecham, plc, Brentford (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/084,510

(22) Filed: May 26, 1998

Related U.S. Application Data (63) Continuation of application No. 08/392,981, filed on Apr. 18, 1995, now Pat. No. 5,761,759.

(30) Foreign Application Priority Data

Sep. 1, 1993 (DE) .................................................. 42 29 152

(51) Int. Cl.⁷ ........................................................... A46B 9/04
(52) U.S. Cl. ........................ 15/167.1; 15/143.1; 264/243; 264/247; 264/260; 264/328.8
(58) Field of Search ............................... 15/143.1, 167.1, 15/167.2; 264/243, 247, 260, 328.8

(56) References Cited

U.S. PATENT DOCUMENTS

| | | |
|---|---|---|
| 3,914,081 | 10/1975 | Aoki . |
| 5,014,383 | 5/1991 | Costar . |
| 5,052,071 | 10/1991 | Halm . |
| 5,054,154 | 10/1991 | Schiffer et al. . |
| 5,305,489 | 4/1994 | Lage . |
| 5,339,482 | 8/1994 | Desimone et al. . |

FOREIGN PATENT DOCUMENTS

| | | | |
|---|---|---|---|
| 91 03 553 | 8/1991 | (DE) . | |
| 3628722 | * 2/1998 | (DE) | ................................... 15/167.1 |
| 0001044 | 3/1979 | (EP) . | |
| 0611533 | * 8/1994 | (EP) | ................................... 15/167.1 |
| 1542567 | * 10/1968 | (FR) | ................................... 15/143.1 |
| 9409675 | * 5/1994 | (WO) | ................................... 15/167.1 |

* cited by examiner

*Primary Examiner*—Randall E. Chin
(74) *Attorney, Agent, or Firm*—Finnegan, Henderson, Farabow, Garrett & Dunner, L.L.P.

(57) ABSTRACT

Toothbrush body having a handle, a head, and a neck section joining the neck to the handle. This body is made of at least two materials, separated from each other for strength and aesthetics.

22 Claims, 10 Drawing Sheets

TOOTHBRUSH AND METHOD FOR MAKING SUCH TOOTHBRUSH

This application is a continuation of application Ser. No. 08/392,987 filed Apr. 18, 1995 U.S. Pat. No. 5,761,759.

BACKGROUND OF THE INVENTION

1. Field of the Invention

The invention relates to a toothbrush with a toothbrush body, comprising a shaft-like handle, a neck section joining said handle and headpiece for toothbrush bristles, said body being made of a first plastic material through injection moulding, and said body being provided with two or more portions made of a second material, e.g. elastic and/or non slip material such as rubber-like material, or material having a colour different from that of said first material.

Further, the invention relates to a method for making a toothbrush of the type having a shaft-like handle, a neck-section joining said handle and headpiece for toothbrush bristles, said body being made of a first plastic material through an injection moulding step, and said body being provided with two or more portions made of a second material, e.g. elastic and/or non-slip material, or a material having a colour different from that of said first material, through a further injection moulding step.

2. Description of the Related Art

Most of the various shapes of toothbrushes are already known. When used, the brush is rotated between the fingers holding it, according to the various positions for the dental areas to be cleaned, and then held securely for the cleaning process itself. Location of position essentially takes place at the front end of the handle in front of the neck section joining the head of the brush, as the toothbrush is held between the thumb and index fingers. This holding area customarily has shapings, possibly provided with a profiled portion, which favour advantages holding of the brush only in a "preferred" position or possibly also in a position rotated 180 degrees to this. Intermediate positions require the hand or arm to be twisted, making it uncomfortable, however, to carry out the cleaning movement which is intended.

In the art, it is known to have a toothbrush with one or more non-slip portions applied to the toothbrush body. Such portions are provided by a single point injection moulding of elastic and/or non-slip material, e.g. rubber-like material, to fill recesses on the toothbrush body, thus forming said portions. However, single point injection moulding implies that when having two or more areas of recesses to be filled in order to create such portions, there must be a material flow channel or channels available between such areas or recesses on said body in order to enable said material to flow into said areas or recesses in such a single shot, single point injection moulding step. However, such channels will in most cases be aesthetically non-satisfactory, and more than often a matter of design trade-off. Further, especially on toothbrush handles made of transparent material and in cases of desiring a more flexible approach in toothbrush design, such channels will in some cases cause the toothbrush body at the location of such channels, or adjacent thereto to be structurally weaker, in particular at the neck region of the toothbrush body. In particular, if both the head and handle of the toothbrush are to have such elastic and/or non-slip material, the prior art method of using single point injection moulding of such material will result in a toothbrush having a structurally weakened neck because of the material flow channels to be located in said neck.

SUMMARY OF THE INVENTION

To avoid said deficiencies related to both the toothbrush itself and the method for making such toothbrush, it is proposed for such toothbrush that said portions made of said second material are physically spaced apart and isolated by means of said first material. Such toothbrush will have an aesthetically improved appearance, as well as being structurally stronger than any prior art toothbrush of such type.

In order to make such toothbrush with the said properties, it is proposed that the method, according to the invention, provides that said second material is ejected through a single step, multi-point injection process into spaced apart recesses on said body to form said portions, said recesses being physically isolated from each other by said first material. Thereby, a single step injection moulding of said second material will be provided without the deficiencies of the prior art material flow channel or channels on said body.

Further, embodiments of the toothbrush and the method for making the toothbrush will appear from the attached patent claims as well as from the description below, with reference to the enclosed drawings.

BRIEF DESCRIPTION OF THE DRAWINGS

The invention, together with its essential details, is explained below in greater detail with the aid of the enclosed drawings.

DETAILED DESCRIPTION OF THE PREFERRED EMBODIMENTS

Figure 1:
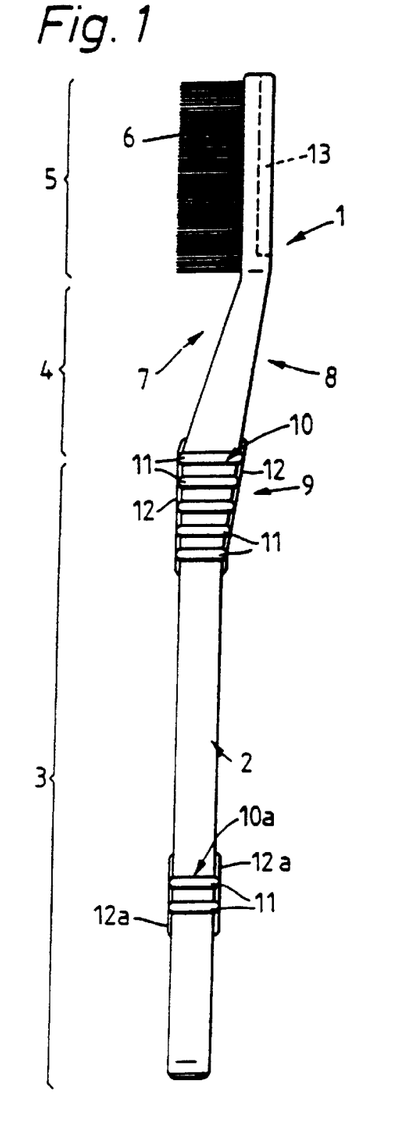
FIG. 1 shows a side view of a preferred embodiment of the toothbrush according to the invention.

FIG. 1 shows a toothbrush 1 with a toothbrush body 2, the longitudinal extension of which is divided into three sections 3, 4, 5. These sections comprise a shaft-like handle 3, a necksection 4, as well as a headpiece 5 at the front end. The headpiece 5 has bristles 6 on its upper side.

FIGS. 6, 8, 10, 12, 14, 16, 18 and 20 each also show toothbrush 1 with a toothbrush body 2, the longitudinal extension of which is divided into three sections 3, 4, 5 with bristles 6 on the headpiece 5.

In the further course of this description, the side of the brush body from which the bristles 6 project will be denoted as the front 7 and the opposite side as the rear 8 of the toothbrush.

As can be clearly seen from FIGS. 1–3, 6–13 and 16–17, the handle 3 has finger rest portion 9 with an essentially circumferential profiled section 10 at the front end. In the present example, this profiled section is formed by suitably elastic, circumferential rings 11 being mutually spaced in the longitudinal direction of the toothbrush. The finger rest portion 9 extends over an area which approximately corresponds to the length of a thumb resting at this area of the toothbrush and could in a typical example be approximately 2 cm long.

The rings 11 are located in ring shaped recesses extending around the handle cross sectional circumference and are provided through a second multi-point injection process following the making of the toothbrush body 2 made through a first injection moulding process. Said body is made of a first plastic material. Elastic and/or non-slip materials could be used as the said second material, such material being mechanically softer than said first material of the toothbrush body, thus providing non-slip surfaces on the toothbrush body. Alternatively, said second material could be of the same type as said first material, but of different colour than said first material.

Due to the said two-step injection processes, said second material will fit tightly into the recesses provided in said body 2.

Figures 20, 21, 22, 23:
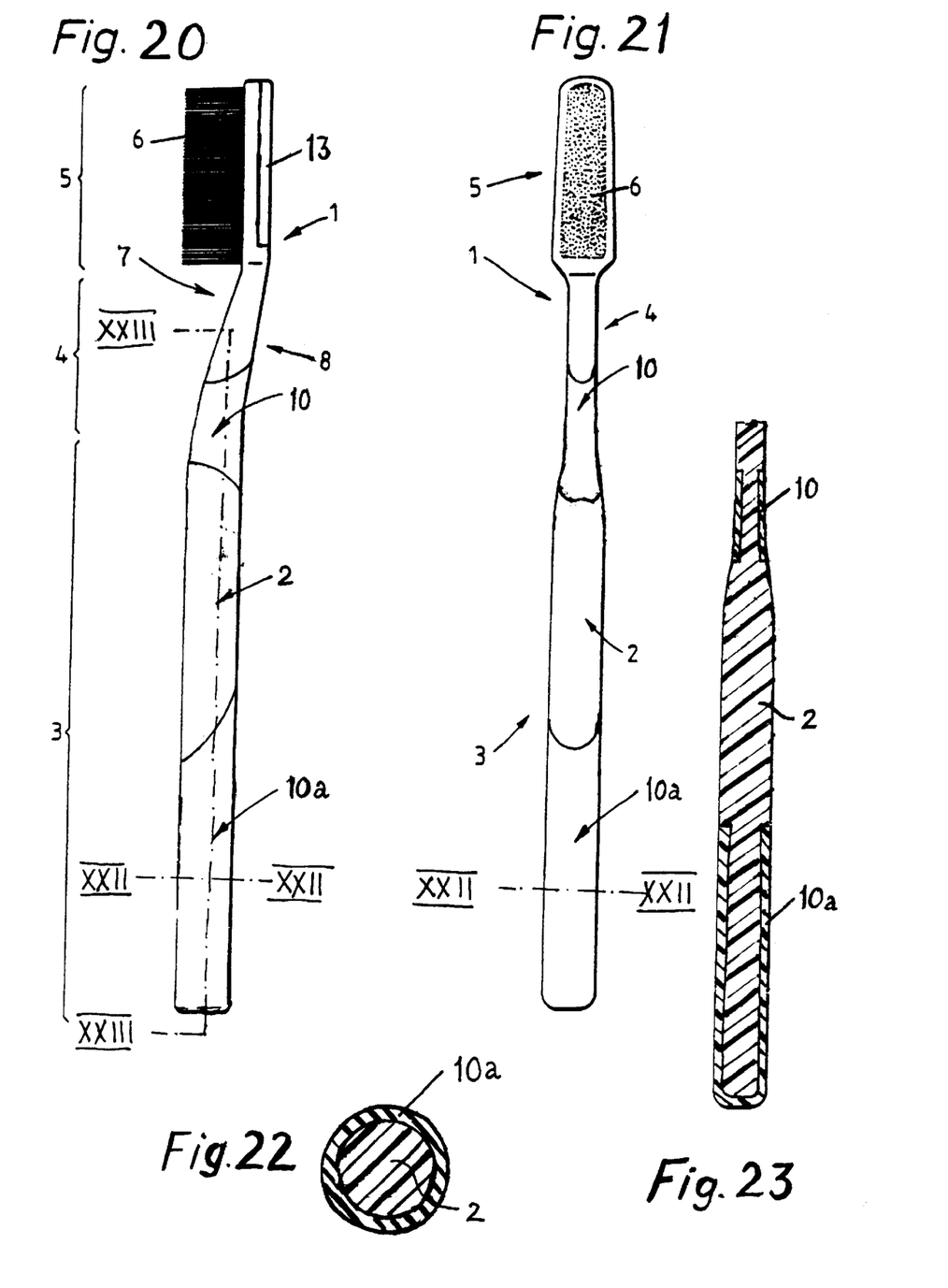
FIGS. 20, 21, 22 and 23 are a side view, a front view, a cross-section at XXII—XXII on FIGS. 21 and 22, and a longitudinal section XXIII—XXIII on FIG. 20, respectively, representing another embodiment of the toothbrush, according to the invention.

Instead of annular continuous circumferential rings 11, such rings may also have interruptions along the circumference. However, it is important in this regard that the profiled sections of the finger rest portions allow the toothbrush to be held virtually equally well in practically all positions of rotation of the toothbrush. This is also facilitated by the shape of the cross section of the toothbrush body shown at III—III in FIG. 2 which, while preferably being rectangular or square with rounded corners, as shown in FIG. 3, may possibly be of circular cross section as shown in FIG. 22.

Said portions of the toothbrush made from said second material may have a different colour from the rest of the brush body, thus additionally distinguishing the said portions from the toothbrush body. In cases of the toothbrush body being made of a transparent material, such differently coloured second material may provide a highly satisfactory aesthetic appearance of the overall toothbrush.

Figure 2:
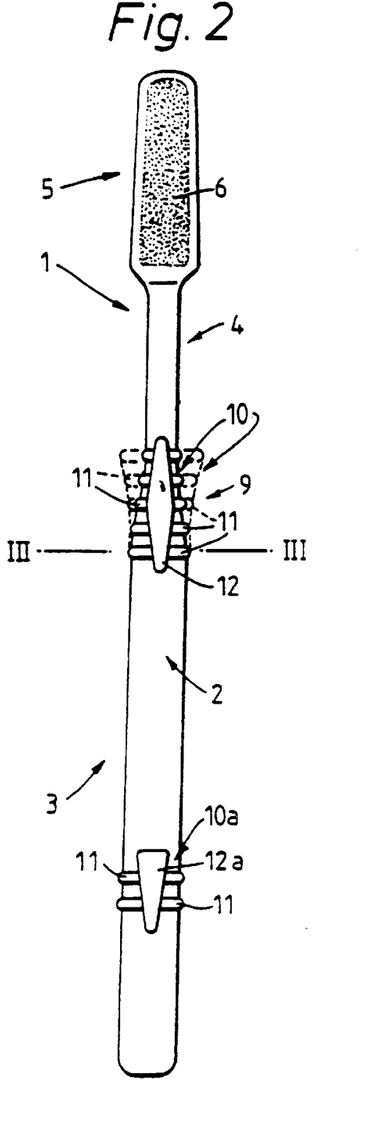
FIG. 2 is a front view rotated 90 degrees in relation to the view of FIG. 1.
Figure 3:
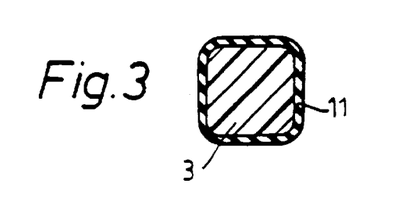
FIG. 3 is an enlarged cross section of the toothbrush at III—III of FIG. 2.

In the example of FIG. 2, the finger rest portion 9 is located at a part of the handle 3 which tapers towards the neck section 4 of the toothbrush. As indicated by means of dotted lines in FIG. 2 and solid lines in FIGS. 9 and 13, an ergonomic shaping of the finger rest portion 9 could, however, be provided, corresponding to the general shape of a thumb surface. This could be essentially symmetrically circumferential or at least be provided on the front and the rear of the toothbrush body 2.

In addition to the profiled section 10 of the finger rest portion shown in FIGS. 1–2 and 6–21 it can be seen from the examples of FIGS. 1 and 2 and 6–21 that there is a further profiled section 10a at the free end region of the handle 3, said section particularly serving as a rest for the ball of the thumb. Like profiled section 10, profiled section 10a also has circumferentially arranged rings 11, in FIGS. 1 and 2 and 6–9 only two such rings are provided. However, it should be noted that the number and spacing of rings 11 as shown in FIGS. 1 and 2 and 6–9 and 16 and 17 may vary both at the finger rest area 9 and at the free end region of the toothbrush.

For the sake of clarity, the cross section of the finger rest portion 9 shown in FIG. 3 in the section through a ring 11 has a comparatively large recess depth, which, however, in practice could be a few tenths of a millimeter.

If necessary, the rings 11 can also be injected directly or almost directly onto the surface of the handle 3 at the area of the finger rests portion 9 which is provided.

In addition to said annular profiled sections 10 and 10a, surfaces 12 and 12a integral with said sections 10 and 10a, respectively, are provided in the example of FIGS. 1 and 2 at the front 7 and at the rear 8 of the toothbrush, approximately at the area of the ring-like profiled sections 10 and 10a. These surfaces or members 12 may slightly project above the contour of the brush body 2, however being approximately flush with the profile height of the rings 11 or possibly extending slightly thereabove.

As shown in the drawings, in particular FIGS. 1–2, 6–9 and 16–17, the annular profiled sections 10 and 10a can take the form of radial rings with the ring plane being approximately at right angles to the longitudinal axis of the brush body. On the other hand, it is also possible to provide such rings extending at an angle to the longitudinal axis of the brush body. Further, it is conceivable that approximately zig-zag disposed circumferential rings or profiled sections of that type are provided on the brush body. As indicated by the portion 13 of FIGS. 1, 6, 8, 10, 12, 14, 16, 18 and 20, such portion could be provided with said second material in order to make at least the edges of the brush head softer.

Thus, during the making of the toothbrush, it will be noted that the portions thereof including said second material are physically separated and isolated from each other as shown in FIGS. 1–2 and 6–21 with no material flow channel for the second material extending between such portions. Such interconnecting channel or channels between such regions to be provided with said second material would be undesirable, in particular on account of physical strength and also for aesthetical reasons, in particular in connection with a transparent form of brush body 2.

The invention is now to be further described with reference to FIGS. 4 and 5 of the drawings.

Figure 4:
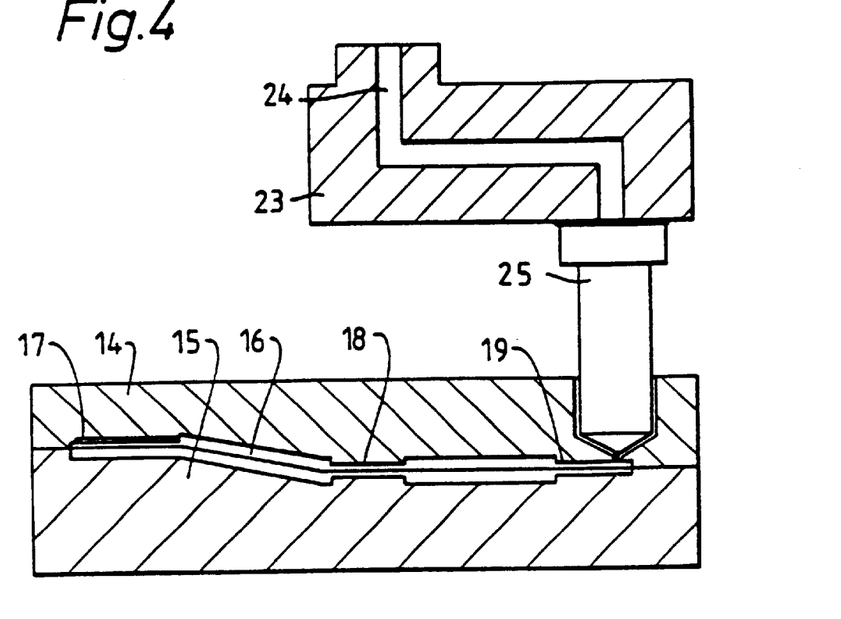
FIG. 4 shows a cross section through an injection moulding apparatus for carrying out a first injection step for making a toothbrush body of a first material.

In FIG. 4 there is shown an apparatus for making the tooth brush body 2 of the first material. In a conventional manner, two mould parts 14 and 15 are provided, said mould parts forming therebetween an injection cavity 16 to form the toothbrush body 2. As noted from FIG. 4, the head of the toothbrush has a recessed region 17 for receiving in a subsequent injection moulding step said second material. Similarly, the toothbrush body is to have slimmer sections 18 and 19 near the neck and the free end of the toothbrush, respectively. Said regions 17, 18 and 19 are intended for receiving said second material to form portions 20, 21 and 22, as to be further explained in connection with FIG. 5. In FIG. 4 said first material for making the toothbrush body 2 is supplied through a manifold 23 having a material flow channel 24. Said first material exits from said manifold through nozzle means 25 and into the cavity 16, in the example shown at the rear end of the body 2 to be made.

Figure 5:
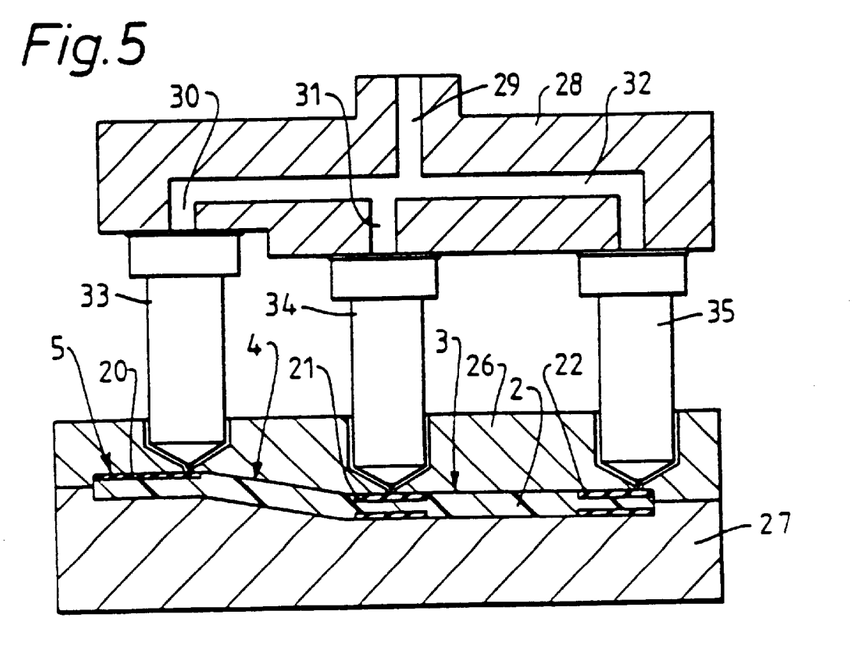
FIG. 5 shows a device for multi-point injection moulding of a second material to fill out specific recesses on said toothbrush body.
Figure 6:
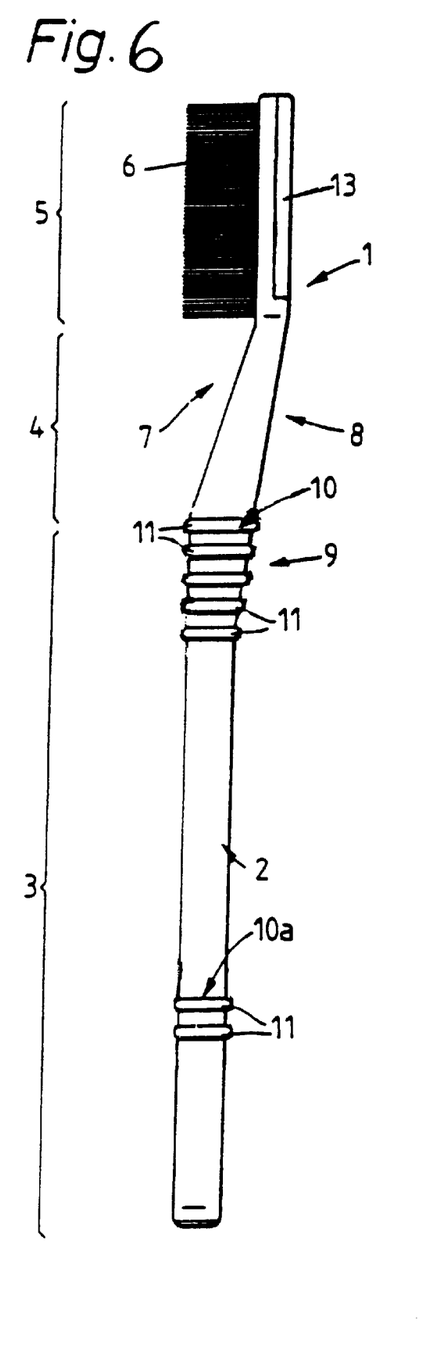
FIGS. 6 and 7 are side and rear views, respectively, of another embodiment of the toothbrush according to the invention.
Figure 7:
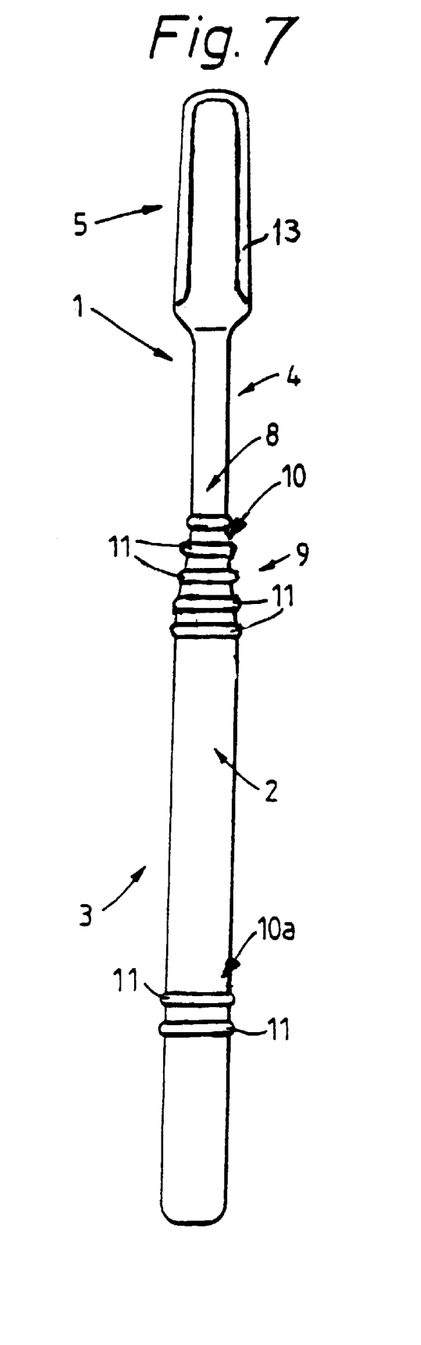
Figure 8:
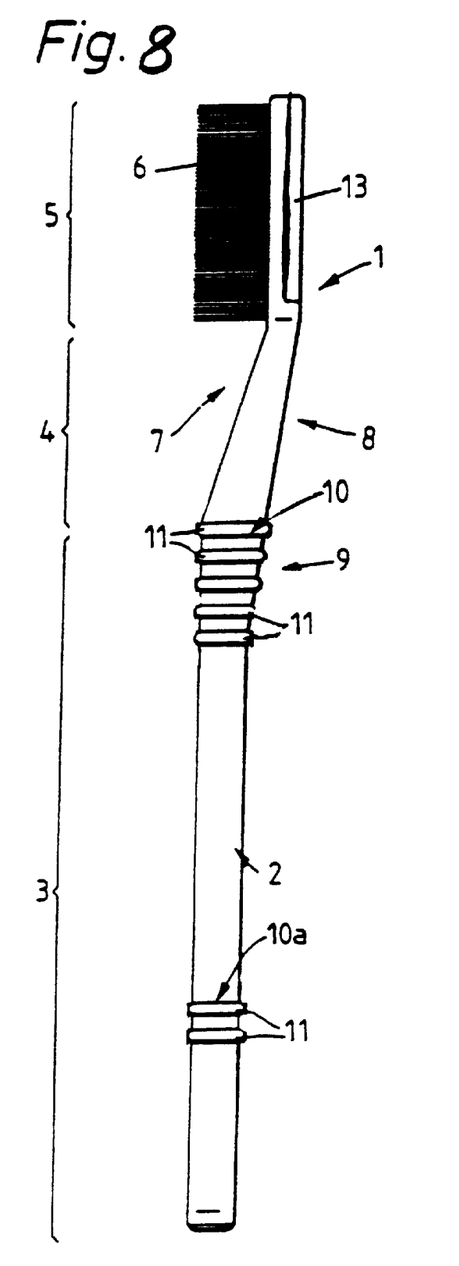
FIGS. 8 and 9 are side and front views, respectively, the same as shown in FIGS. 1 and 2, of yet another embodiment of the toothbrush according to the invention.
Figure 9:
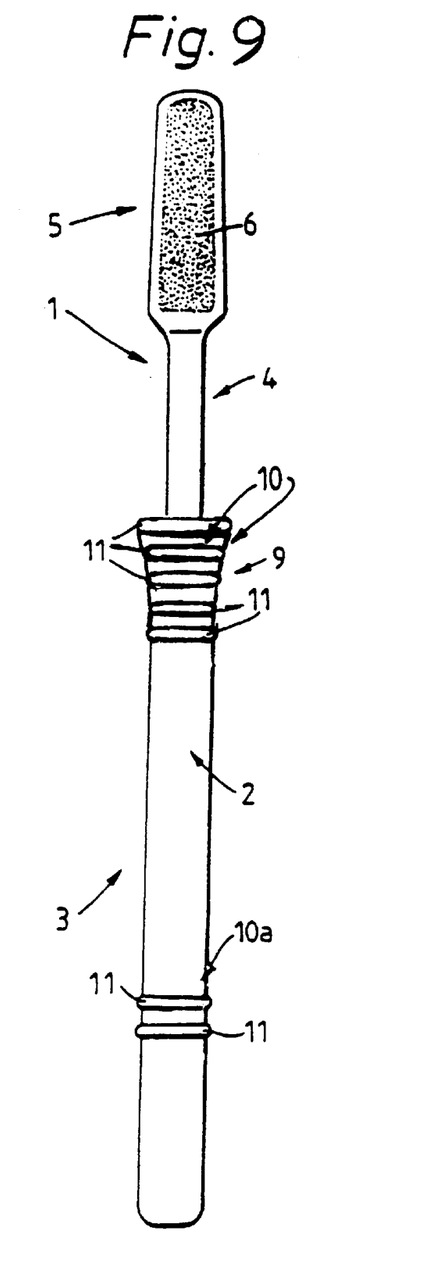
Figure 10:
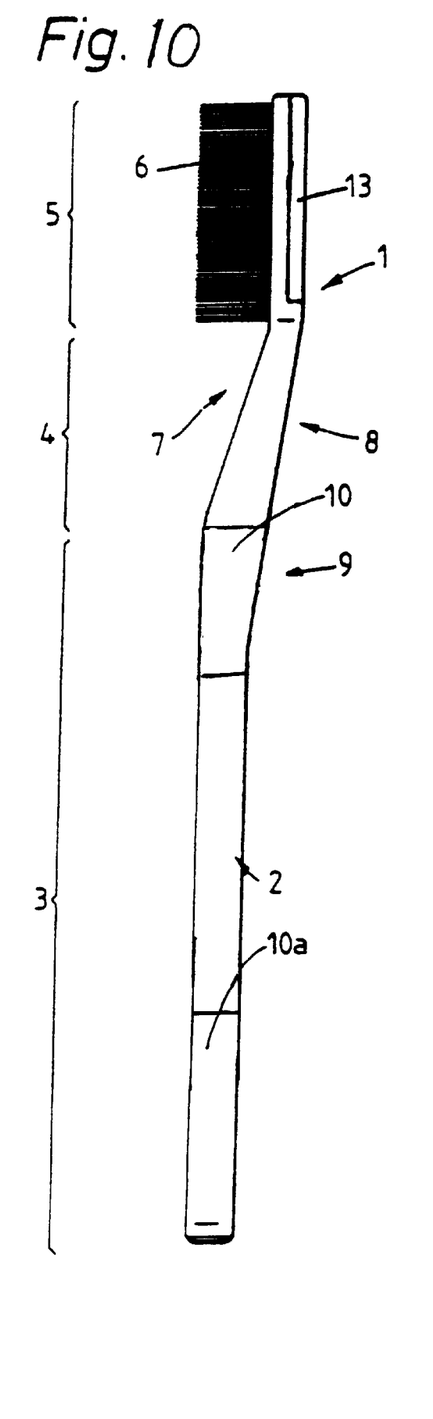
FIGS. 10 and 11 are side and front views, respectively, the same as shown in FIGS. 1 and 2, of yet another embodiment of the toothbrush, according to the invention.
Figure 11:
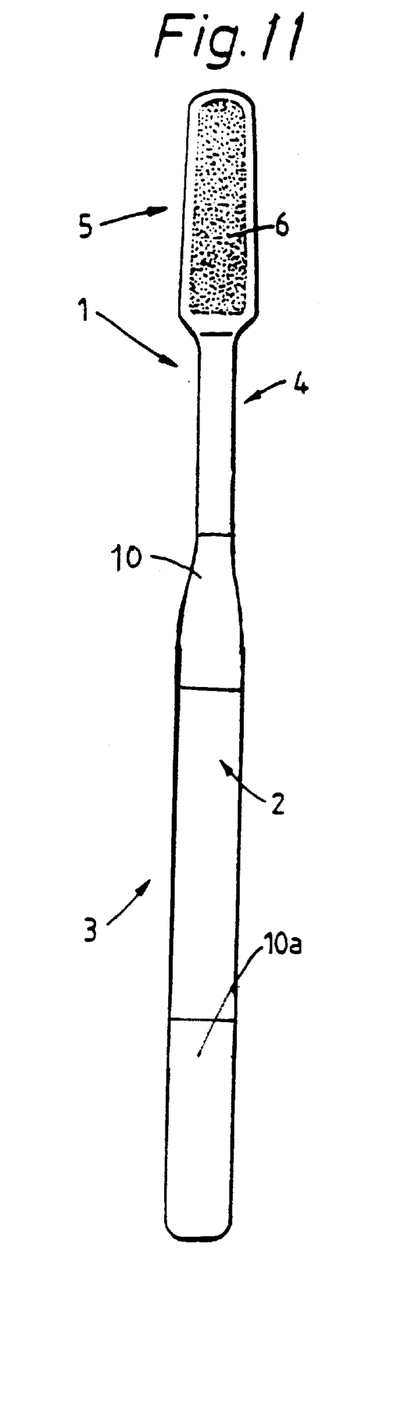
Figure 12:
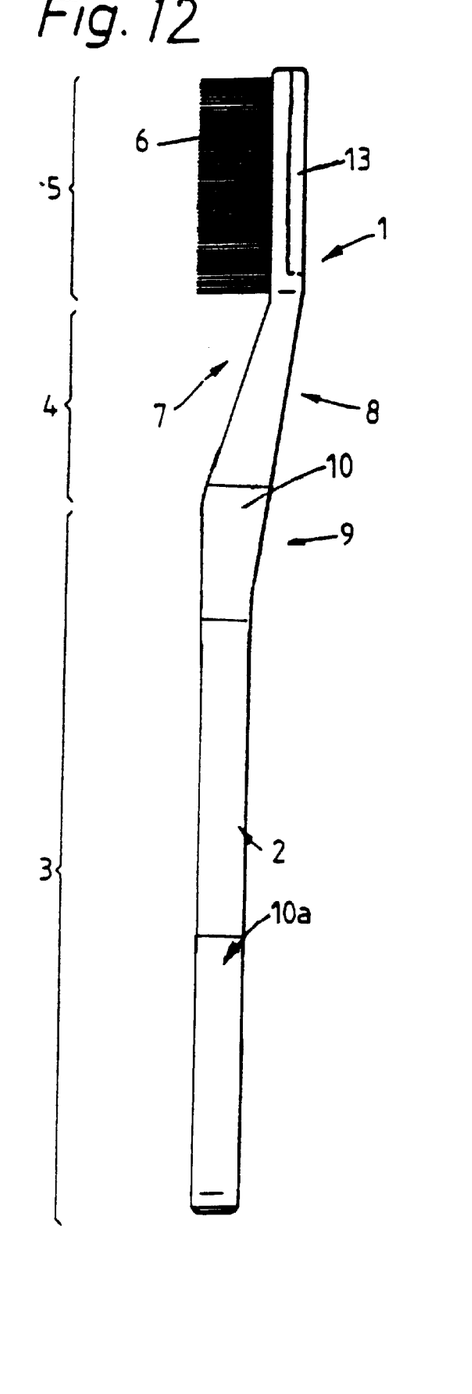
FIGS. 12 and 13 are side and front views, the same as shown in FIGS. 1 and 2, respectively, of yet another embodiment of the toothbrush, according to the invention.
Figure 13:
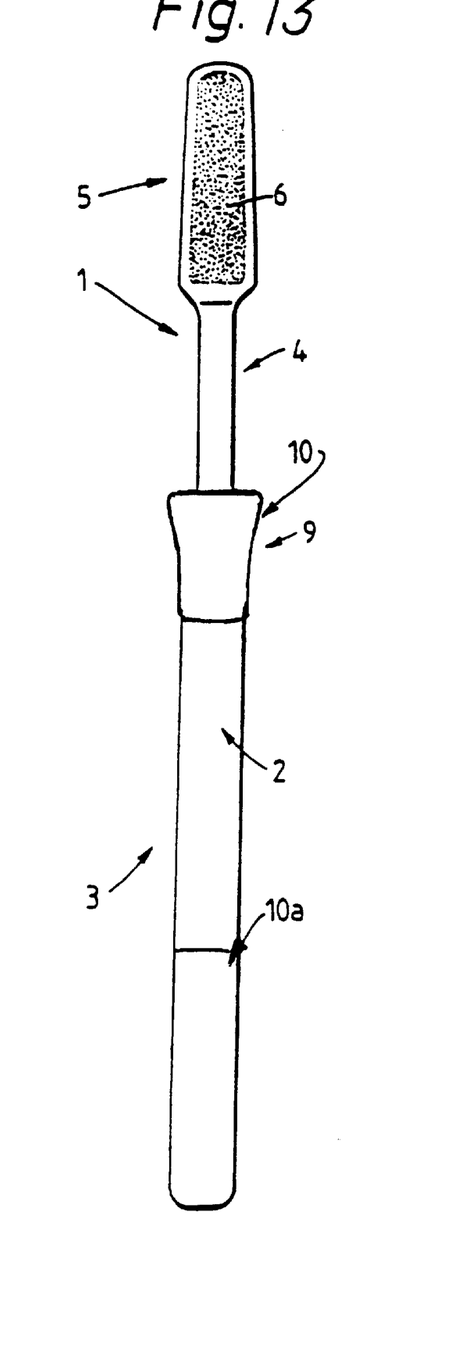
Figure 14:
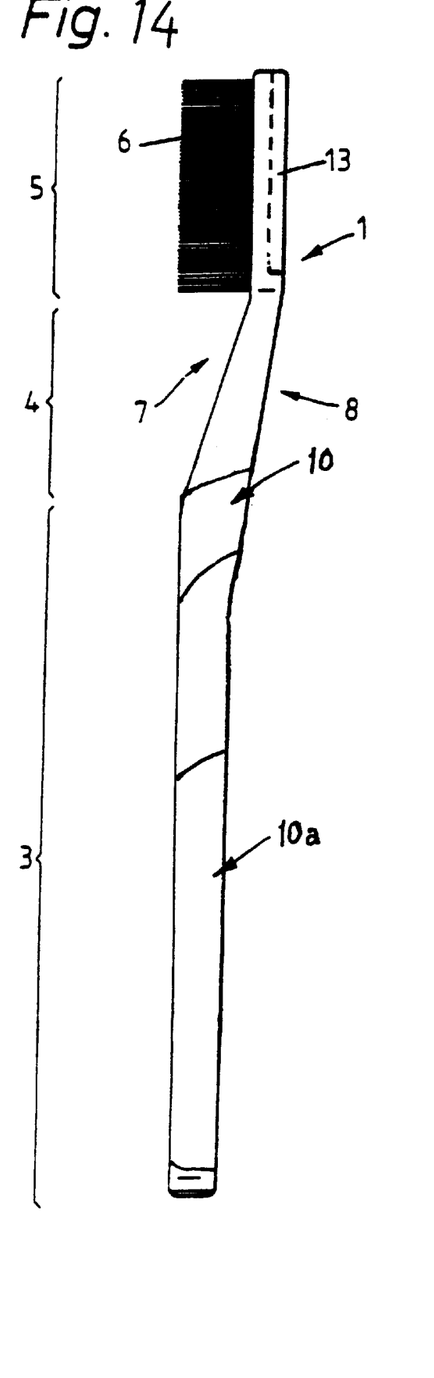
FIGS. 14 and 15 are side and rear views, respectively the same as shown in FIGS. 6 and 7, of yet another embodiment of the toothbrush, according to the invention.
Figure 15:
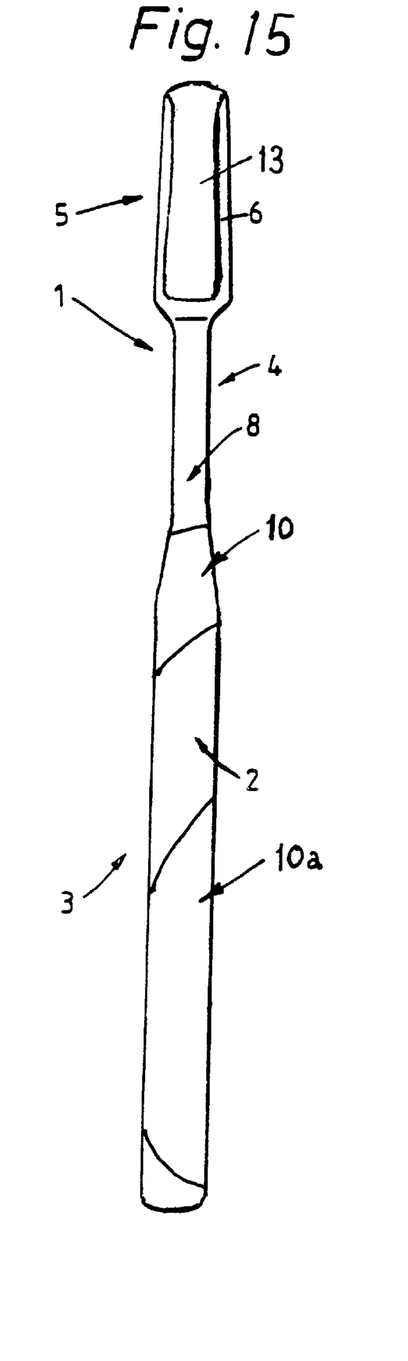
Figure 16:
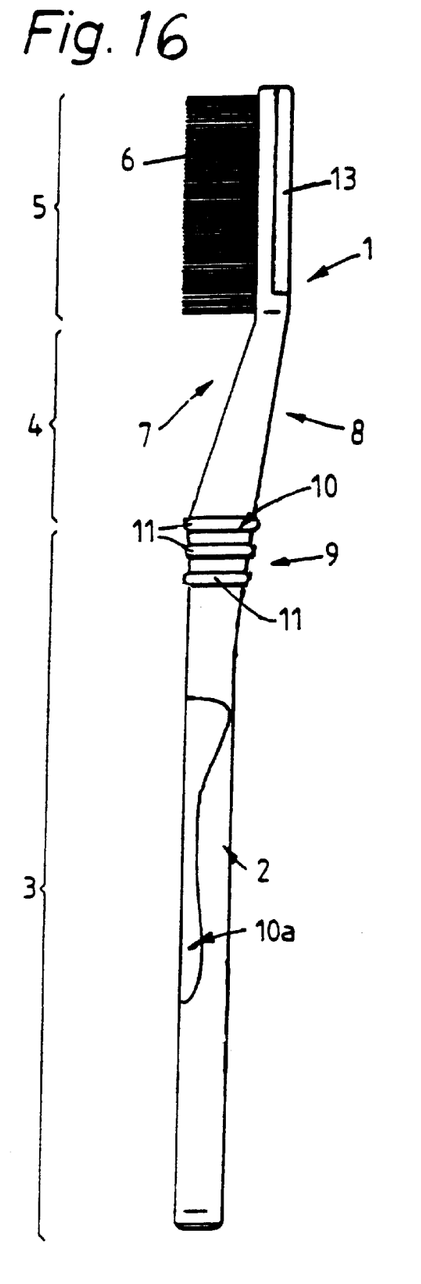
FIGS. 16 and 17 are side and front views, respectively, the same as shown in FIGS. 1 and 2, of yet another embodiment of the toothbrush, according to the invention.
Figure 17:
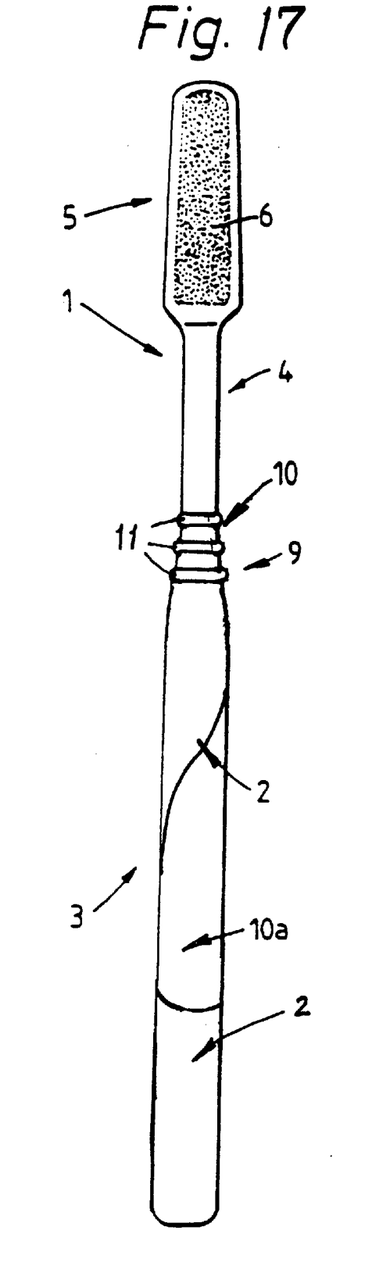
Figure 18:
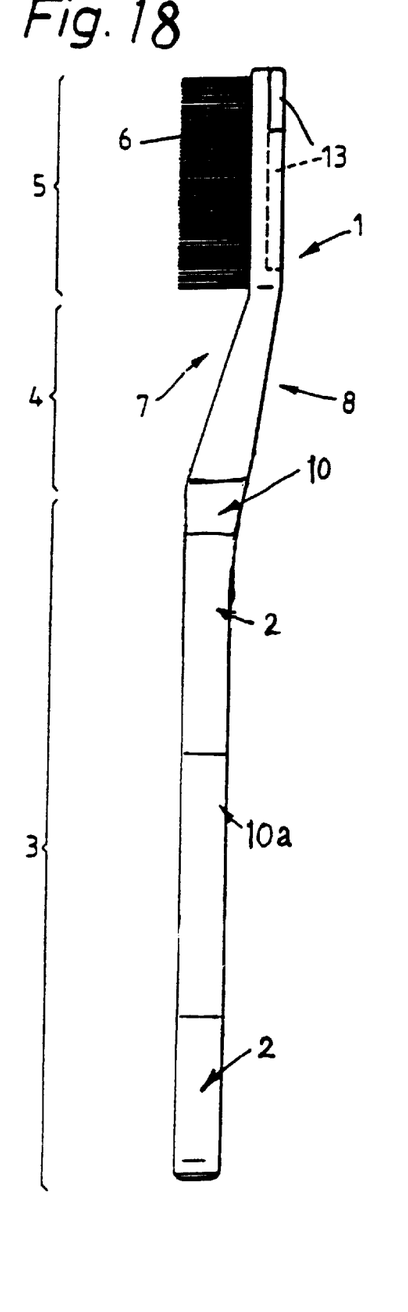
FIGS. 18 and 19 are side and rear views, respectively, the same as shown in FIGS. 6 and 7, of yet another embodiment of the toothbrush, according to the invention.
Figure 19:
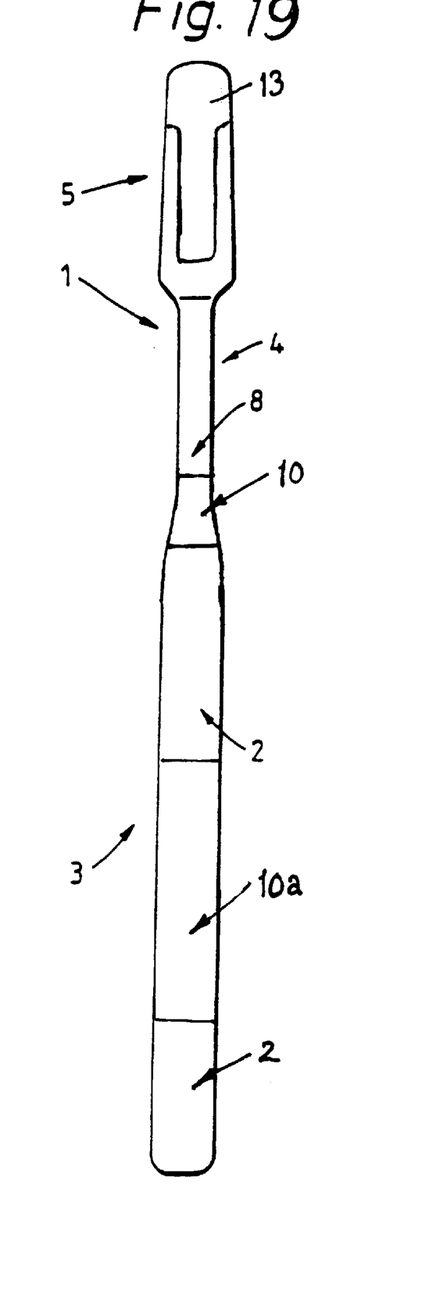

After the completion of the first injection moulding step for making the toothbrush body of said first material, said body is placed in a second mould constituted by mould parts 26 and 27 as shown in FIG. 5.

The apparatus has a manifold 28 with a material flow inlet 29 for said second material. The inlet 29 is branched off into outlet channels 30, 31 and 32. The material flow from channel 30 exits through a nozzle 33 into the region 17 of the toothbrush body 2 (as shown in FIG. 4) to form said portion 20 on the toothbrush. Similarly the material flow from outlet channel 31 exits through a nozzle means 34 at region 18 of the toothbrush body 2 to form the portion 21 on the toothbrush. Finally, the material flow from outlet channel 32 exits through nozzle means 35 at region 19 of body 2 to form portion 22 on the toothbrush. Thus, in the injection moulding step as shown and described in connection with FIG. 5, multi-point injection moulding is used to create said portions 20, 21 and 22 in a single injection moulding step. As indicated above, and as further clearly seen from FIG. 5, there are no interconnecting material flow channels between the created portions 20, 21 and 22, thus providing the toothbrush with an aesthetically satisfactory appearance, while retaining the physical strength of the overall toothbrush.

It will be readily understood that the examples illustrated in FIGS. 1, 2 and 3 and 6 through 23 of the toothbrush, as well as the examples shown in FIGS. 4 and 5 in connection with the method for making such toothbrush, may easily be modified within the scope and the inventive concept of the present invention.

Thus, it will be readily understood that although the multi-point injection as demonstrated in FIG. 5 has three nozzle means for single step injection moulding, there could be provided, e.g., two nozzle means or four or more nozzle means with associated outlet channels in the manifold 28.

What is claimed is:

1. A toothbrush comprising:
   a toothbrush body comprising a shaft-like handle, a head piece retaining bristles, a neck section, each made of a first plastic material, a first end and a free end, the neck section joining the handle to the head piece;
   the toothbrush body further comprising a first portion and a second portion made of a second material, the first and second portions of the second material being separated by the first material, the first portion being located proximal to the first end of the handle; the second portion being located proximal to the free end, and a third portion made of the second material; the third portion of second material being completely separated from the first and second portions of the first material; the third portion being a portion of the head piece.

2. A toothbrush structure according to claim 1, wherein the first portion is a portion of the neck section.

3. A toothbrush structure according to claim 1, wherein the second material is a plastic material having one property selected from the group consisting of an elastic property, a non-clip property, a rubber-like property, or a color different from that of the first material.

4. A toothbrush structure according to claim 3, wherein the first material is a transparent plastic material.

5. A toothbrush structure comprising:
   a toothbrush body comprising a shaft-like handle, a head piece retaining bristles, a neck section, each made of a first plastic material, a first end and a free end, the neck section joining the handle to the head piece;
   the toothbrush body further comprising a first portion and a second portion made of a second material, the first and second portions of the second material being separated by the first material, the first portion being located proximal to the first end of the handle; the second portion being located proximal to the free end; wherein the first portion is located at the head.

6. The toothbrush of claim 5, wherein the first portion comprises at least one annular ring.

7. The toothbrush of claim 5, wherein the second portion comprises at least one annular ring.

8. The toothbrush of claim 5, wherein the first portion comprises a surface extending along the shaft-like handle.

9. The toothbrush of claim 5, wherein the second portion comprises a surface extending along the shaft-like handle.

10. The toothbrush of claim 5, further comprising a third portion made of the second material; the third portion of second material being completely separated from the first and second portions by the first material; the third portion being a portion of the neck.

11. A toothbrush structure according to claim 5, wherein the toothbrush body further comprises another recess spaced apart from the pair of recesses, the another recess accommodating a third portion of the second material, the third portion being completely physically separated from each of the first and second portions by the first material.

12. A toothbrush structure according to claim 5, wherein the first portion is located proximal to a front end of the handle and the second portion is located on the handle.

13. A toothbrush structure according to claim 5, wherein the first portion comprises second material located on the front side of the toothbrush body.

14. A toothbrush structure according to claim 5, wherein the first portion comprises second material on a rear side of the toothbrush body.

15. A toothbrush structure according to claim 5, wherein the first portion comprises an annular profiled section.

16. A toothbrush structure according to claim 5, wherein the first portion comprises a substantially circumferentially profiled configuration.

17. A toothbrush structure comprising:
   a toothbrush body comprising a shaft-like handle, a head piece retaining bristles, a neck section, each made of a first plastic material, a first end and free end, the neck section joining the handle to the head piece;
   the toothbrush body further comprising a first portion and a second portion made of a second material, the first and second portions of the second material being separated by the first material, the first portion being located proximal to the first end of the handle; the second portion being located proximal to the free end and a third portion; wherein the third portion is located at the head.

18. A toothbrush structure according to claim 17, wherein the third portion comprises second material located on the front side of the toothbrush body.

19. A toothbrush structure according to claim 17, wherein the third portion is a portion of the neck portion.

20. A toothbrush structure according to claim 17, wherein the third portion comprises second material on a rear side of the toothbrush body.

21. A toothbrush structure according to claim 17, wherein the third portion comprises an annular profiled section.

22. A toothbrush structure according to claim 17, wherein the third portion comprises a substantially circumferentially profiled configuration.

* * * * *

UNITED STATES PATENT AND TRADEMARK OFFICE
CERTIFICATE OF CORRECTION

PATENT NO. : 6,276,019 B1  
DATED : August 21, 2001  
INVENTOR(S) : Knut Olaf Leversby et al.

Page 1 of 1

It is certified that error appears in the above-identified patent and that said Letters Patent is hereby corrected as shown below:

Title page,
Item [73], in the Assignee, line 2, "(DE)" should read -- (GB) --.

Column 5,
Line 57, "non-clip property" should read -- non-slip property --.

Column 6,
Line 43, before "free end", insert -- a --.

Signed and Sealed this

Twenty-third Day of April, 2002

Attest:

JAMES E. ROGAN
Attesting Officer
Director of the United States Patent and Trademark Office